United States Patent
Polyakov et al.

[15] 3,655,209
[45] Apr. 11, 1972

[54] METALLIC SEALING MEMBER FOR LOCKING AND SPLIT DEVICES

[72] Inventors: Georgy Filippovich Polyakov, ulitsa Akademicheskaya, 23, kv. 8.; Vladimir Lvovich Vanin, ulitsa Gogolya, 31, kv. 35.; Vladimir Alexandrovich Kamardin, ulitsa Dachnaya, 25, kv 71., all of Novosibirsk, U.S.S.R.

[22] Filed: Dec. 22, 1969

[21] Appl. No.: 887,222

[30] Foreign Application Priority Data

Feb. 20, 1969   U.S.S.R..................................1300958

[52] U.S. Cl. .......................................277/235 R
[51] Int. Cl............................................F16j 15/08
[58] Field of Search...........161/213, 207; 277/235 R, 235 A, 277/227; 156/275

[56] References Cited

UNITED STATES PATENTS 3,029,559   4/1962   Treptow...............................161/213

*Primary Examiner*—Robert I. Smith
*Attorney*—Waters, Roditi, Schwartz & Nissen

[57] ABSTRACT

The present invention discloses a metallic sealing members used, for instance, in valves, and having a hermetically sealing coating.

In accordance with the present invention the method of forming a hermetically sealing coating is carried out both with the aid of a metallic packing disposed between the contacting surfaces of sealing members, and directly from the materials of these members.

5 Claims, 4 Drawing Figures

METALLIC SEALING MEMBER FOR LOCKING AND SPLIT DEVICES

The present invention relates to metallic sealing members for locking and split devices, methods of forming a hermetically sealing coating on such sealing members, and locking devices having a hermetically sealing coating.

The present invention may be used for hermetically sealing multiple locking and split devices operating under conditions of vacuum or under high pressure.

Devices employing the inventive sealing members may be used in the electronic and radio industries, vacuum and cosmic engineering, nuclear and semi-conductor physics, and for widely varied technological and scientific-research instruments.

Presently known are metallic sealing members for locking and split devices which operate under conditions of vacuum or under very high pressure.

The prior art sealing members differ from each other in the design of their contacting surfaces, the type of connection (split or permanent one), and the method of hermetic sealing.

The metallic sealing members used in vacuum and pipe-line engineering are essentially sealing surfaces, cavities or bosses provided on the valves and seats of the locking devices, or sealing surfaces, cavities and bosses provided on the flanges and pipes of the split devices, as well as various types of packings disposed between the sealing members, and are usually made from a metal which is softer than that of said sealing members.

Unsplit or single-piece devices are hermetically sealed by means of soft or hard soldering and through various types of welding. Though they attain a high degree of hermetic sealing, heat resistance and mechanical strength, such packings are inconvenient in use due to difficulties encountered during assembling and dismantling.

In accordance with another method of hermetic sealing, used as sealing members may be metallic packings made from a material having a low yield point, such as gold, copper, nickel, soft iron, or aluminum. Under the action of considerably great forces of compression, exerted by the elements of the sealing couple, the packing is subjected to plastic deformation, as a result of which the material of the packing fills up micro-cavities, scores and cracks to be found on the sealing surfaces. This method of hermetic sealing requires the high-quality precision machining of the sealing surfaces and replacement of the sealing packing after dismantling. Furthermore, considerable mutual diffusion of the materials of the packing and sealing surfaces takes place when the sealing couples are heated to remove a gas, which diffusion hampers dismantling of the connection and decreases the service time of the sealing members.

Furthermore, due to considerable strengthening of the sealing material under the action of the preliminary applied force of hermetic sealing, there are often encountered difficulties resulting from the necessity to develop high specific forces of hermetic sealing.

The afore-mentioned reasons hamper employment of sealing packings in multiple locking and split devices being hermetically sealed, for instance, in high-vacuum valves, systems of vacuum sluicing, etc.

There are known many constructive ways of overcoming the difficulties inherent in the method of hermetic sealing of split connections by means of sealing packings.

In accordance with one of said methods, use is made of sealing members with a flat annular packing, provided with a groove-and-wedge profile, which makes it possible to substantially decrease the force required for the hermetic sealing by considerably decreasing the packing area subjected to deformation. In accordance with another method use is made of opposite bosses of similar shapes and sizes, having a spherical or rectangular profile, which allows to increase the hermetic sealing by increasing the contact area, and, finally, in accordance with a third method the sealing members are fashioned as conic or plano-parallel surfaces which in the course of compression deform a flat or wire annular packing disposed therebetween and, due to great friction forces, effect a plastic flow of the material of the packing and destruction of the surfaces of the oxide film. The resultant cold local welding of clean metallic surfaces, which takes place at this time, is used for improving the hermetic sealing of the connection.

However, the above-mentioned constructive ways of solving the problems of making a reliable sealing to be heated and used for locking and split connections, as well as many other methods of hermetic sealing envisaging use of, for example, packings having a certain predetermined profile with stepped sealing surfaces, or packings fashioned as multilayer structures (in order to decrease the hermetically sealing loading, or to raise their chemical or thermal resistance), do not make it possible to obtain the essential technical characteristics which are necessary for their multiple use, for instance, during multiple cycles of heating and cooling.

Use of conventional diffusion or powder packings which are adapted to obtain a high degree of hermetic sealing but can be used only in static vacuum plants or instruments, which are seldom dismantled, also fail to provide the necessary technical effect.

Particularly strict requirements are set forth with respect to heated multiple locking devices, for example, high-vacuum valves which are to sustain multiple cycles of heating and cooling, opening and closing without replacement of the sealing member and decrease of the hermetic sealing and increase of gas separation, one of the primary requirements in this case being the restoration of the mutual position of the sealing members of the locking unit and preservation, and at the same time, maintaining a constant force of hermetic sealing.

Conventional multiple locking devices are sealed at the expense of plastic deformation or by means of the material of the locking member (plate), or the seat, and, therefore, the sealing couple is made from materials which sharply differ in their hardness. For example, the seat may be made from steel and the valve made from aluminum, copper or silver, or vice versa. To provide for their ready manufacture, they are formed as bodies of revolution whose shape attributes to crushing or cutting-off of the softer material during subsequent sealing (wearing). A disadvantage of such constructions lies in that the parts of the locking member do not preserve their mutual position during the course of operation, or in that the force of hermetic sealing increases, the increase being accompanied by an increased inflow through the contact surfaces of the locking member.

Also known in the art are multiple locking devices employing flat annular or profiled, for example, toroidal, metallic sealing packings. In some cases, for example, in order to increase their thermal or chemical resistance, or to decrease the hermetically sealing loading, such packings are made as multilayer structures. However, they have a short service life and possess a number of the disadvantages inherent in the above-mentioned sealing members of split devices to be hermetically sealed.

Thus, among the main disadvantages of conventional multiple locking and split devices are the following: impossibility to provide a mutual disposition of the parts of the locking member during the course of operation, an increased force of hermetic sealing accompanied by an increased inflow through the contact surfaces of the locking member (i.e. deterioration of the hermetic sealing, destruction or wear of the contact surfaces of the sealing members) and, as a result of the foregoing, an insufficiently long service life, or an inadequate number of working cycles.

The primary object of the present invention is to provide such metallic sealing members, a method of forming on them a metallic hermetically sealing coating (layer), and a locking device with a hermetically sealing coating, that would provide for a greatly improved hermetic sealing of locking and split devices during the course of their repeated use.

This and other objects are accomplished by means of a metallic sealing member for locking and split devices operating under conditions of vacuum or extremely high pressure, wherein, according to the invention, there is provided a hermetically sealing coating which is essentially a finely dispersed metallic layer whose yield strength is lower than that of the sealing member per se.

In accordance with the present invention the hermetically sealing coating is formed on metallic sealing members in the following manner: one of the sealing members, which is essentially a metallic packing, is disposed between two other sealing members which are movable relative to each other and which contact the packing, all the three sealing members are being placed in vacuum, the packing then compressed by said movable members and they are maintained under vacuum for a certain period of time, the force of compression and the temperature being chosen such as to provide for a molecular-diffusion cohesion of the metal of the packing with the metal of the contacting surfaces of said movable members. Subsequently, at least one of the movable sealing members is drawn aside by tearing it off said packing, and the whole cycle is repeated several times until a finely dispersed metallic layer is formed both on the contacting surface of the packing at the side where said movable member was torn-off, and on the surface of the latter, which contacted said packing.

In case no packing is used, the hermetically sealing metallic layer may be formed on the contacting surfaces of the sealing members directly from the materials of the latter by way of their repeated drawing together in vacuum, maintaining them therein for a certain period of time, the force of compression and temperature being chosen such as to provide for molecular-diffusion cohesion of the metal of the surfaces of both sealing members, and drawing them apart.

It is expedient to fashion the locking device, preferably a vacuum valve, in such a manner that the contacting surfaces of its sealing members have a hermetically sealing metallic layer.

The following description of exemplary embodiments of the present invention is given with reference to the accompanying drawings, in which.

Figure 1:
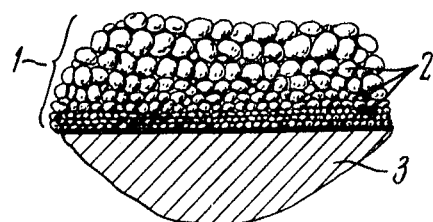
FIG. 1 shows an enlarged view of the structure of the metallic hermetically sealing layer formed on a sealing member, according to the invention in a longitudinal section.

Thus, the subject matter of the present invention lies in the provision of an improved method of hermetic sealing of multiple locking and split devices, characterized in that a metallic hermetically sealing coating (layer) in the form of a granular finely dispersed structure is formed on the contacting surfaces of the sealing members, the granules of said structure having different sizes and shapes and being in cohesion with each other and with the contacting surfaces of the sealing members through molecular-diffusion forces.

This layer is characterized by a variable yield strength which is minimal on the surface and maximal in the depth of the layer, for example, at the point of its contact with the material of the sealing member.

At the same time, the material of the sealing member on whose contacting surface the hermetically sealing layer is formed must possess a yield strength equal to or exceeding the maximum yield strength of the material from which the hermetically sealing layer is formed, the thickness of the layer being chosen depending on its yield strength and the specific loading of the hermetic sealing.

It has been found out that mutual compression of two clean metallic surfaces made, for instance, from one and the same metal, with the specific forces of compression being sufficiently great, results in their complete cohesion and formation of a single crystal grating even at a low temperature. In engineering this process is known as cold welding of metals.

It is also known that with two heterogenous metallic surfaces contacting each other and heated up to a certain temperature (of an order of 0.7–0.8 of the melting point of the most easily fusible component), there appears their mutual diffusion, which, in the long run, results in diffusion welding. The diffusion welding may take place, for instance, between gold and copper, copper and stainless steel, iron and aluninum, etc.

Both the cold and diffusion welding processes are used in engineering for making hermetically sealing packings in permanent connections. The process of formation of a monolithic piece of metal consisting of similar or heterogenous metals, taking place in hard-to-dismantle connections thus obtained, may develop to such an extent that the drawing-apart of the connected surfaces will result in their breakage so that each of the surfaces will have pieces of the metal from the opposite surface, welded thereto. This phenomenon is considered to be undesirable as it prevents the repeated use of the sealing packings.

In accordance with the present invention, the phenomenon of the cold or diffusion welding is used for forming and shaping a metallic hermetically sealing layer on the contacting surfaces of sealing members. This is accomplished by placing the sealing members with cleaned (for example, washed with organic solutions or distilled water, chemically or ionically pickled, electrically polished, etc.) surfaces in vacuum, additionally cleaning them by heating (preferably up to a temperature at which decomposition of the surface oxides takes place), mutual compression of their contacting surfaces with a force depending on the materials used, the area of contact and the temperature of the contacting surfaces, maintaining them for a certain period of time under the action of a preset force of compression and a preset temperature, by drawing them apart until the contacting surfaces are completely disengaged from each other, and repeating the method of the mutual compression and drawing-apart several times until a finely dispersed metallic hermetically sealing layer is formed on the contacting surfaces of the sealing members. The aforedescribed cycle may be effected by tearing off the packing one sealing member only.

Commencing with the first mutual compression of the sealing members, when they are being maintained under the action of a predetermined force of compression and a predetermined temperature, there takes place plastic deformation of micro-bosses and heterogeneities on the contacting surfaces, which is accompanied by destruction of surface films (for instance, oxide films, etc.). Concentration of forces on small areas of contact in separate small zones of the contacting surfaces provides conditions for cold or diffusion local welding. As it has already been noted hereinbefore, the drawing-apart of the sealing members which have been subjected to sufficiently intensive compression results in that each contacting surface has pieces of the material of the opposite surface, soldered or welded thereto. The size of these pieces which are of an irregular shape is from 1 mu to 1 mm.

In accordance with the conditions of the formation of the hermetically sealing layer it is necessary to choose such a force of compression, temperature and time period during which the sealing members are kept compressed, depending on the materials used, cleanliness and method of treatment of the contacting surfaces, whereby the sizes of the pieces of the material transferred from one surface onto another are from 1 to 100 mu.

Generally speaking, the process of the transfer of the materials from one surface onto another, taking place in vacuum when the contacting surfaces are made from one and the same material, is symmetrical. With the processes of the mutual compression and drawing-apart repeated, due to natural small displacements of the surfaces relative to each other, the local welding takes place every time on new portions.

One and the same pieces of the materials may be transferred from one surface onto another several times. During the process the contacting surfaces are mutually loosened, the torn-up materials are mixed, and new portions of the surfaces are involved in the process until the contacting portions of the two surfaces are coated with a homogenous, fine (10–400 mu), finely dispersed (the size of the granules varying from 1 to 100 mu) metallic layer. The structure of this layer is shown in FIG. 1, and it may be described as a metallic layer 1 of fine granules 2 in cohesion with each other and with the lower layers 3 of the metal of the sealing member on which it is formed by molecular-diffusion forces.

Simultaneously with the process of the formation of the above-described finely dispersed layer 1, there takes place deformation compression (cold working) of the material of the sealing members in the zones disposed under the contact surfaces. The process of the cold working substantially changes the mechanical properties of the metal: the metal hardness is sharply increased, as well as the yield strength having a predetermined correlation therewith.

Thus, the relatively fine structured (10–400 mu), finely dispersed metallic layer formed in the course of repeated processes of compression and drawing-apart of the contacting surfaces of the sealing members, is disposed on much thicker layers of the metal having an increased hardness or an increased yield strength, with the thickness of this layer varying and reaching an order of 1 mm depending on the shape of the sealing members, materials used and temperature.

The finely dispersed metallic layer formed in a vacuum on the contacting surfaces of the sealing members contains no oxide films or other impurities, and is essentially a fine-grained structure. As separate monolithic granules of the metal in this layer are in a relatively weak cohesion with one another (the area of the contact surfaces between adjacent granules may be much smaller than the total surface of granules), relatively small forces are required to displace granules relative to one another, to destroy old connections and form new ones. This layer is similar to a layer of sand in which, when glued, the grains can be easily displaced relative to one another without destroying the layer homogeneity.

When forming in vacuum the afore-described layer, original traces of treatment disappear from each of the contacting surfaces participating in the process, and they acquire a slightly uneven shape.

Thanks to its mechanical properties, low yield strength and high cohesion of the granules to one another in particular, as well as to a low gas permeability of its compressed material, the finely dispersed metallic layer may be used for hermetically sealing packing surfaces of split and locking connections.

The subject matter of the present invention will become more apparent upon considering a description of a method of forming a metallic hermetically sealing layer on a copper wire used as a sealing member of extra-high vacuum metallic heated valves, and of steel sealing members-bosses of a locking member or seat, operating together therewith.

Figure 2:
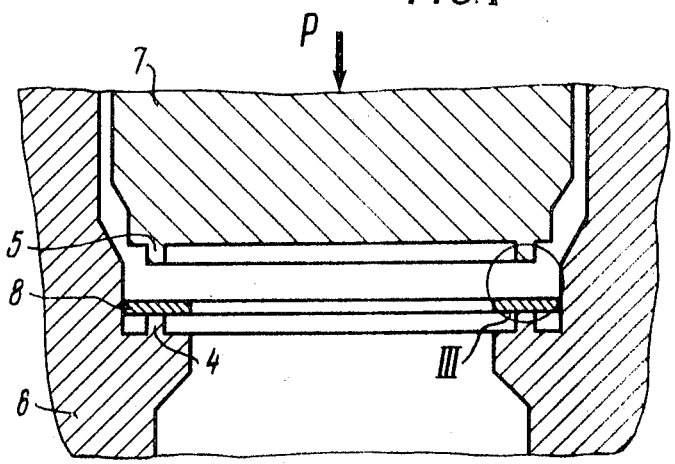
FIG. 2 shows a partial view of a locking device with a metallic packing disposed between the contacting surfaces of its sealing members in a longitudinal section.

The design of the valve is illustrated in FIG. 2 showing annular sealing bosses 4 and 5 provided on a seat 6 and a locking member 7, respectively, and a flat annular sealing packing 8 disposed therebetween. The locking member 7 and the seat 6 may be made from steel, for example, stainless steel, in which case the sealing packing 8 is made from a technical or pure copper; in case it is to be used in extra-high vacuum valves, it is desirable to make the packing 8 from a vacuum or oxygen-free copper.

The sealing packing 8 is subjected to technological treatment according to a conventional method.

The precise centering of the locking member 7 relative to the seat 6 is accomplished by coupling the outer diameter of the locking member 7 and the inner diameter of the seat 6 in accordance with allowances corresponding to a slide fit. With the packing 8 secured in the seat 6 as is shown in FIG. 2, chosen is either the outer diameter of the packing 8 or the inner diameter of the ring, which is coupled with the inner diameter of the seat 6 in accordance with the free fit. In case the packing is secured on the locking member, it is the inner diameter of the packing that is chosen, which diameter is coupled with the outer diameter of the locking member in accordance with the free fit.

Figure 3:
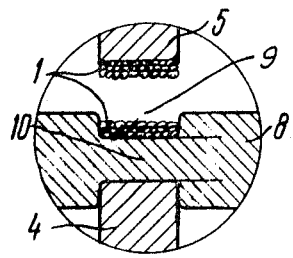
FIG. 3 shows an enlarged view of unit III of FIG. 2.

When the packing 8 is compressed for the first time between the sealing bosses 4 and 5 of the seat 6 and the locking member 7 which are being drawn together in the axial direction, the latter bosses deform the soft packing 8 to form thereon sealing grooves 9 (FIG. 3) whose depth depends on the specific loading P (FIG. 2) and the original thickness of the packing 8.

Simultaneously with the formation of the sealing grooves 9 on the packing 8, there takes place an increase of its outer diameter, which makes it possible to tightly fix the packing 8 in the seat 6.

Under analogous conditions, in case the packing 8 is fitted on the locking member 7, the inner diameter of the packing 8 decreases, which allows tightly fixing the latter on the locking member.

The afore-described method of mutual centering of the valve 7, seat 6 and packing 8 is necessary to ensure that during the subsequent working cycles "compression - drawing apart - compression" the disengaged sealing boss 5 of the locking member 7 always arrives in the groove 9 formed by it on the packing 8 during the first act of compression.

In the course of the repeated working cycles "compression - drawing apart - compression," carried out in vacuum at an appropriately chosen temperature (ranging from the indoor one and up to 300°–400° C.) a metallic hermetic sealing layer 1 consisting of granules 2 of finely dispersed copper is formed on the contacting surfaces of the disengaged sealing boss 5 and the bottom of the respective sealing groove 9 of the packing 8 in accordance with the afore-described diagram.

Concurrently, in the course of the repeated processes of compression of the sealing packing 8 by the sealing bosses 4 and 5, there takes place compression of middle layers 10 of the packing 8, disposed between the bosses 4 and 5, as a result of which the limit of their resilient deformation increases up to values characteristic of compressed copper that has undergone cold working, i.e. their yield strength is increased up to 34–38 kp/mm$^2$. At the same time, the hermetic sealing layer 1 remains capable of being plastically deformed under the action of specific loads beginning with approximately 5 kp/mm$^2$.

Since the specific load (5–20 kp/mm$^2$) necessary to cause the plastic deformation of the hermetic sealing layer 1 is much less than the limit of the resilient deformation of the packing 8 as a whole (34–38 kp/mm$^2$), or at least in the middle layer 10 subjected to the loading P, the locking member of the valve, prepared in the afore-described manner, turns capable of normal operation.

The movable sealing members of the valve are hermetically sealed in this case by the metallic hermetic sealing layer 1 formed from the packing 8, said layer 1 being disposed on the contacting surfaces of the sealing boss 5 and the sealing groove 9 of the packing 8. The sealing boss 4 and the sealing groove 9 of the packing 8 are hermetically sealed along their non-split surfaces by means of their vacuum-tight contact. With the packing 8 removed, it can be seen that the surface of the sealing groove 9 which was in contact with the sealing boss 4 that has not been drawn aside contains no hermetic sealing layer 1, looks bright and precisely repeats the profile of the respective surface of the sealing boss, whereas the surface of the groove which was in contact with the boss 5 that has been moved aside, looks dull or slightly uneven, and does not repeat the profile of the surface of this boss.

During the course of normal operation of the above-described sealing unit of the valve, i.e. when the specific loads P acting upon the packing are within a range of 5–20 kp/mm$^2$, it preserves its properties as a hermetic sealing member, both in vacuum and under a pressure in the course of an indefinitely long period of time, since during the successive drawing-together and drawing-apart sequences of its movable parts the hermetically sealing layer is self-restored (reproduced) on both contacting surfaces of the sealing members, which are moved laterally relative to each other.

It is quite apparent that the initial cleanliness of the treatment of the surfaces of the packing and the sealing boss will predetermine the degree of the hermetic sealing, i.e. the value of the specific inflow of the unit as a whole, particularly so on the surfaces which provide for hermetic sealing only due to a vacuum-tight contact, i.e. on the surfaces of the bosses and the bottom of a respective groove that are not disengaged and where the diffusion cohesion of copper with steel is hampered by fine layers of oxides that have not been destroyed. Such surfaces must be free of transverse scores and scratches, and, when used in ultra high vacuum devices, transversely located worn-out portions. The initial cleanliness of the treatment of the surfaces of the sealing bosses to be used in the sealing units of extra-high vacuum valves should not be below the 7–8th grates.

The hermetic sealing and operating properties of the afore-described sealing unit for valves have been tested within a wide range of temperatures, and namely, from $+600°$ C. to $-195°$ C. It has been found out as a result of these tests that the value of the specific hermetically sealing force somewhat increases at low (nitrogen) temperatures and reaches 16–20 $kp/mm^2$ with $T = -196°$ C.; and decreases at higher temperatures, reaching the values of an order of 2–3 $kp/mm^2$ when $T = +600°$ C., the hermetic sealing obtained at a temperature of $-196°$ C. being preserved approximately up to $+500°$ C. This is explained by the fact that the coefficients of linear expansion of copper and stainless steel are almost equal within a range of temperatures from $-196°$ C. to $+600°$ C., the insignificant difference between them being compensated for by the plasticity of the hermetically sealing layer.

One of the advantages of the present invention lies in that in the afore-described modification the hermetically sealing layer is formed simultaneously on both contacting surfaces of the split sealing members (the boss and the packing), which, with the design of the sealing unit being appropriately chosen, provides for self-restoration of the hermetically sealing layer and preservation of its properties in the course of operation. Results of the tests and use of the present invention in experimental ultra high vacuum heated valves having the diameter of the inlet passage from 6 to 200 mm show that, with $T=20°$ C., the durability of the sealing unit provided with the hermetically sealing layer exceeds 4,000–5,000 working cycles.

Another advantage of the present invention lies in that during the course of prolonged use the seat and the locking member restore their mutual position. This restoration is characterized by a mutual axial displacement of the locking member and the seat, which takes place after 3,000 working cycles have been carried out at $T=20°$ C., the value of this displacement not exceeding 0.05–0.1 mm.

Figure 4:
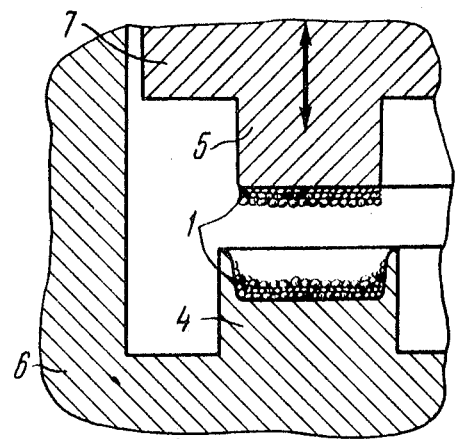
FIG. 4 shows a partial view of a locking device with a hermetically sealing layer formed on the contacting surfaces of the sealing members in a longitudinal section.

In accordance with another constructive embodiment of the present invention (FIG. 4) the sealing bosses 4 and 5 of the seat 6 and the locking member 7, respectively, having a hermetically sealing layer 1 formed thereon in accordance with the afore-described method are alone capable of hermetic sealing of the sealing member without using any packing. In case the hermetically sealing layer is made from a material different from that of the sealing bosses, the layer is preserved through mixing and mutual transfer of the material of the layer from one surface onto another, and vice versa.

The afore-cited examples relate to cases when the present invention is used in locking (sealing) units of valves. It is used somewhat differently in some split vacuum devices employed for hermetical sealing of vacuum from the atmosphere.

In such cases, for example, in large-size flange split connections, it is sometimes rather difficult or impossible to form a hermetically sealing layer directly on the sealing members of the split (due to the atmosphere). Therefore, the packing with the hermetically sealing layer is made separately in a vacuum in accordance with the same method and by means of an arrangement analogous to the locking unit of a valve.

A packing that has been preliminary prepared in the aforesaid manner can be repeatedly used in split connections, whereas conventional packings (having no hermetically sealing layer) can be used one time only.

In other cases, i.e. when the split device can be placed in vacuum, the metallic hermetically sealing layer is formed not only on the packing but on the other sealing members as well.

Thus, the present invention provides for formation on the contacting surfaces of the sealing members of locking and split device of a metallic hermetically sealing layer possessing a high hermetic sealing ability and long service time, complete restoration of its structure and properties during repeated use, a low specific force of hermetic sealing, a high mechanical strength, wear-resistance, chemical and thermal resistance within a wide range of temperatures.

It is clear that the present invention may be attained and used in many other modifications and devices, and may have an arrangement different from the one shown in the accompanying drawings, without deviating from the characteristics of the application.

Furthermore, it is evident that the method of forming a metallic hermetically sealing layer may be also utilized in a number of other modifications without deviating from its intended scope, i.e. the placing of sealing surfaces in a vacuum, their mutual compression up to a predetermined force of compression at an appropriate temperature, drawing-apart or disengaging of the contact surfaces and repetition of the process until a homogenous hermetically sealing metallic layer of a required thickness is obtained.

What is claimed is:

1. A metallic sealing member having at least one surface which can be hermetically and separably sealed with another member, said sealing member comprising at least on said one surface thereof a self-restoring sealing coating constituted as plastically intermixed thin metallic layers of granules formed by repeatedly pressing said one surface of the sealing member together with another member and separating them in a vacuum, said granules of the sealing coating layers being in cohesion with each other and with the underlying metal of the sealing member by molecular diffusion, said coating having a varying hardness in its thickness and a finely dispersed structure on the surface thereof.

2. A member as claimed in claim 1 wherein said sealing coating is constituted of the same metal as that of the underlying metal of the sealing member.

3. A member as claimed in claim 1 wherein said sealing coating is constituted of a metal which has greater plasticity than the underlying metal of the sealing member.

4. A locking device comprising a sealing member as claimed in claim 1 and operable in a vacuum.

5. A locking device as claimed in claim 4 wherein said locking device comprises a second sealing member with a sealing coating in separable engagement with the sealing coating of the first member.

* * * * *